United States Patent [19]
Chakraborty

[11] Patent Number: 5,167,908
[45] Date of Patent: Dec. 1, 1992

[54] DEVICE FOR RECOMBINATION OF HYDROGEN AND OXYGEN

[75] Inventor: Amiya K. Chakraborty, Erfstadt, Fed. Rep. of Germany

[73] Assignee: Gesellschaft Fur Reaktorsicherheit (GRS), Fed. Rep. of Germany

[21] Appl. No.: 837,034

[22] Filed: Feb. 18, 1992

[30] Foreign Application Priority Data

Feb. 22, 1991 [EP]  European Pat. Off. ........ 91102586.4

[51] Int. Cl.⁵ .................................................. G21C 9/00
[52] U.S. Cl. .................................... 376/301; 423/580
[58] Field of Search ................. 376/300, 301; 423/580

[56] References Cited

U.S. PATENT DOCUMENTS

| | | | |
|---|---|---|---|
| 2,718,460 | 9/1955 | Bowen | 422/179 |
| 2,847,284 | 8/1958 | Busey | 423/579 |
| 2,943,921 | 7/1960 | King | 376/301 |
| 3,660,041 | 5/1972 | Moore et al. | 376/301 |
| 4,008,050 | 2/1977 | Betz | 376/301 |
| 4,228,132 | 10/1980 | Weems et al. | 376/300 |
| 4,755,359 | 7/1988 | Klatt et al. | 376/314 |
| 4,911,879 | 3/1990 | Heck et al. | 376/301 |

FOREIGN PATENT DOCUMENTS 0303144 2/1989 European Pat. Off. .
3604416 3/1987 Fed. Rep. of Germany .
3725290 2/1989 Fed. Rep. of Germany .

*Primary Examiner*—Daniel D. Wasil
*Attorney, Agent, or Firm*—Lahive & Cockfield

[57] ABSTRACT

A device for recombination of hydrogen and oxygen with the aid of a catalyst system comprises the catalyst system in a housing 1, which has at least one inlet opening and at least one outlet opening, which are sealed by means of first seals 7 which open as a function of temperature. In this housing, a gas-permeable filter system is also provided in such a manner that after opening of the first seals, the gases or gas mixtures entering the inlet opening do not reach the catlayst system until they have first passed through the filter system. The filter system is essentially impermeable to aerosols and grease. Housing 1 comprises at least one additional opening, which is sealed gas-tight by means of a second seal 5a, 5b which opens as a function of temperature, with the response temperature of this second seal being higher than that of the first seals, and with the second opening being provided in the housing in such fashion that the catalyst system, after opening of the second seal, is exposed directly to the atmosphere surrounding the housing without interposition of the filter system.

27 Claims, 6 Drawing Sheets

DEVICE FOR RECOMBINATION OF HYDROGEN AND OXYGEN

BACKGROUND

The invention relates to a device for recombination of hydrogen and oxygen.

A device of this kind, to be described later in greater detail, is known from U.S. Pat. No. 4,911,879 (Heck et al.).

An apparatus of that nature is discussed in German Patent No. DE-A-36 04 416 (corresponding to the Klatt et al U.S. Pat. No. 4,755,359). As set forth in detail in the Klatt et al. patent, the problem of eliminating hydrogen from a gas mixture arises in particular in nuclear reactor accidents, in which hydrogen escapes into the oxygen-containing atmosphere of the containment vessel or a pressure suppression system of the nuclear reactor, thus creating the risk of an explosion. To avoid this explosion danger, known methods are employed to eliminate the hydrogen through catalytically supported recombination with oxygen to form steam. Especially suitable catalyst materials for this purpose and hence also within the scope of the present invention are described in German Patent No. DE-A-37 25 290. Since a catalyst of this kind forms part of the safety equipment, which is only supposed to operate in the event of a malfunction, care must be taken to ensure that the catalyst retains its functional ability over very many years of storage. For this purpose, methods are known in which the catalyst is stored in an airtight sealed housing, within the vessel or space in which the hydrogen is to be eliminated in the event of an accident, said housing opening automatically when the accident occurs as a result of the influence of pressure and/or temperature, thus exposing the catalyst to the atmosphere-containing hydrogen and oxygen.

During a core meltdown in a reactor pressure vessel (RPV), a temperature rise in the melt of up to 2400° C. is reached, with large quantities of fission products and structural materials being released into the atmosphere of the containment. This results in a mixture of steam and gases in which aerosol particles with a weight concentration of up to 20 g/m$^3$ can be suspended. The term "aerosol" is used herein in a broad sense to mean a suspension of liquid or solid particles in a gas. Thus for example in the low-pressure path at the beginning of the interaction between the melt and the concrete, 1 to 3 tons of dispersed material can be suspended in the air inside the containment vessel. By far the largest component, more than 95%, is non-radioactive. However, most of the radioactive substances are bound to the aerosol particles. The release of hydrogen during reactor accidents, mentioned at the outset, coincides in time with the above release of aerosols.

Model tests have shown that the release of steam occurs practically simultaneously with the beginning of a core meltdown accident, while the release of hydrogen and simultaneously therewith, the release of aerosols, take place only after a certain delay. In the presence of large quantities of steam and a strong flow, the catalytic reaction to remove hydrogen proceeds more slowly. The reaction rate increases exponentially with temperature. It is only when a sufficiently high temperature has been reached on the surface of the catalyst system that a sufficient convection flow develops which is adequate to prevent the aerosol particles contained in the gas mixture from being deposited on the surface of the catalyst. This prevention is aided by the constant generation of reaction steam at the surface of the catalyst system, which becomes constant at a correspondingly high temperature and conversion rate. However, as long as the temperature of the catalyst system is still not sufficiently high during the initial phase, aerosol particles and grease particles contained in the steam can settle on the surface of the catalyst, thus reducing the effective catalyst surface and having a highly negative effect on catalytic reaction.

Heck et al. mentioned at the outset, contains a catalyst system inside a cylindrical tube whose two ends are closed off by seals which open automatically in the event of an accident. The tube is mounted vertically in the area to be protected and has a filter system between its lower end and the catalyst system for chemically neutralizing catalyst poisons. The filter system can be a porous ceramic body or a molded fiber structure containing silver nitrate. When the seals at the two ends of the tube open, the atmosphere containing hydrogen penetrates the tube and passes through the filter into the catalyst system, which heats up because of the exothermic reaction, thus generating a gas flow through the tube.

Examples cited in Heck et al. of seals which open automatically as a function of temperature are diaphragms made of a plastic which melt at high temperatures, as well as bimetallic sheet metal. The bimetallic sheet metal has no gas-tight seal. On the other hand, plastic diaphragms do not provide reliable long-term gas-tight seals. In addition, in the event of ignition, they can burn and impose a burden on the environment through the release of gases.

The steam released initially in the event of an accident, in accordance with the above statements, passes through the rooms of the installation in which circulating pumps, slide bearings, electric motors, etc. are located, thereby carrying with it certain amounts of lubricating and sealing grease. Grease particles that reach the catalyst system can settle out on the catalyst surface, provided their temperature is below the vaporization point of the grease. It has been found that grease deposits of this kind have a highly disadvantageous effect on the action of the catalyst. Even a small amount of grease, only 0.05 g of grease per liter of steam, can prevent the catalytic reaction. To avoid the problems created by the grease, German Patent application P 40 03 833.5, not published previously, describes a protective device for the catalyst system. This protective device essentially consists of filters which are permeable to gas but have a high separation efficiency for aerosols and grease particles. The filters are so-called HEPA (High Efficiency Particulate Air) filters. These filters are made of glass wool and a binder which are highly temperature-resistant (up to about 900° C.). The filters surround the catalyst system in such a way that aerosols and grease particles are kept away from the catalyst surface, while still permitting hydrogen and oxygen to reach this surface. As a result of inclusion by the filter and a correspondingly low heat loss, the temperature of the catalyst surface quickly rises because of the exothermic recombination reaction. As soon as the temperature has reached a value at which grease particles and aerosols can no longer settle on the catalyst surface, the filters open, thus exposing the catalyst system to unimpeded access by the atmosphere of the room to be protected, so that the catalyst system can then produce its total effect. The filters described in that patent application protect the catalyst system in the initial phase of an accident before aerosols and grease particles are deposited, however they cannot prevent the long-term deterioration of the catalyst as a result of catalyst poisons contained in the ambient atmosphere of the vessel, during the storage period prior to an accidental meltdown.

The operating time of a reactor is up to forty years. During this long period of time, the devices for recombination of hydrogen and oxygen must maintain total functional ability in a state of readiness. It is known that palladium and platinum as catalyst materials are sensitive to surface contamination and lose their effectiveness. The alloys described in DE-A-37 25 290 are less sensitive, but no results are available on long-term tests on the effects of impurities such as chlorine, sulfur, and the like.

SUMMARY OF THE INVENTION

The goal of the invention is to design a device of the type described at the outset such that it does not lose its effectiveness either 1) because of a long-term state of readiness or 2) when an accident occurs, as the result of deposition of aerosols and grease particles on the catalyst surface.

The solution to the stated goals provides that the catalyst system is located during the readiness state in a housing which is sealed gas-tight, preventing surface contamination of the catalyst surface. Preferably the housing is filled with an inert gas such as argon, nitrogen, hydrogen, or helium under pressure (on the order of $10^5$ Pa).

On the basis of the design of the device according to the invention, three operating states can be distinguished, namely the readiness state before an accident occurs, a preliminary operating state following the occurrence of an accident, and the final operating state after a temperature is reached on the surface of the catalyst which guarantees effective recombination and at which a negative effect on the catalyst action produced by aerosol or grease deposits need no longer be feared.

The occurrence of an accident is linked to a temperature increase to which the first seals, which open as a function of temperature, respond and expose openings in the housing, sealed gas-tight previously, so that the ambient atmosphere can penetrate the housing. The device thus shifts from its readiness state to the preliminary operating state. The response temperature of these first seals in the preferred application of the device is in the range of about 100° C. The position of the catalyst system, the filter system in the housing, as well as the position and size of the openings, are selected so that sufficient hydrogen and oxygen for recombination reach the catalyst system, but an overly strong flow is not produced and grease and aerosol particles are kept away from the filter system, so that they cannot settle on the catalyst surface. The flow, which is relatively weak in this operating state, results in a rapid temperature rise in the catalyst system due to the exothermic reaction of the hydrogen, so that after a relatively short time a temperature above approximately 160° C. is reached. at which a so-called self-sustaining accelerated catalytic reaction takes place. Upon this temperature rise, the response temperature of a second seal which opens as a function of temperature is reached, which then exposes another opening in the housing, thus bringing the device to its final operating state. In this final operating state, the catalyst system is fully exposed to the surrounding gas mixture from which the hydrogen is to be removed without the interposition of the filter system.

The seals which open as a function of temperature are preferably soldered to the housing so that a reliable permanently gas-tight connection is produced. By choosing a solder which melts at a given temperature, preferably 100° C. for the first seals and 160° C. for the second seals, the seals can be welded to the housing such that at the melting point of the solder used, the seals are opened.

Two embodiments of the invention will now be described in greater detail with reference to the schematic diagrams.

DESCRIPTION OF THE ILLUSTRATED EMBODIMENTS

Figure 1:
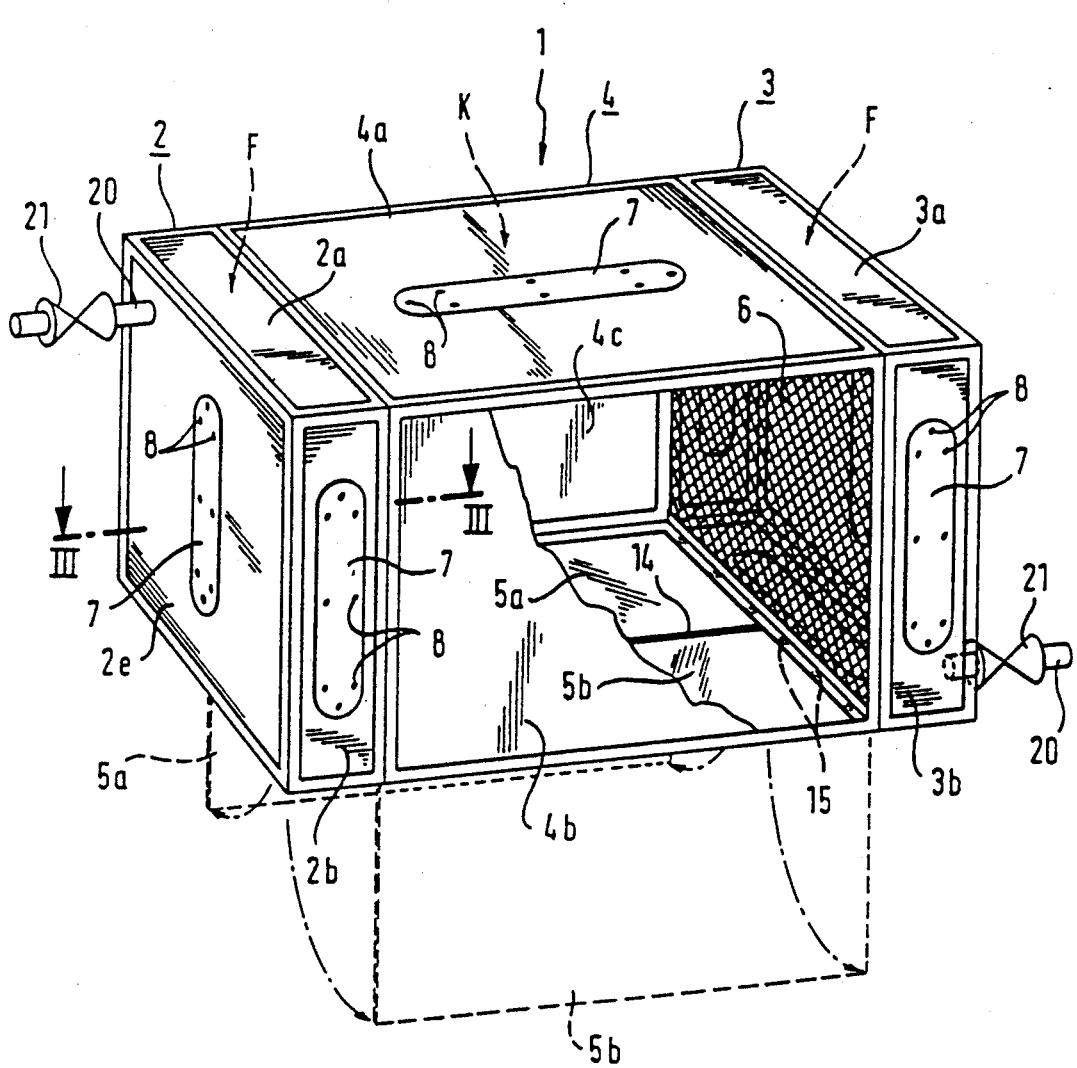
FIG. 1 is a perspective view of one embodiment of the housing.

In the diagram shown in FIG. 1, for the sake of improved clarity, the catalyst and filter systems have been omitted. Housing 1 is composed of three sections 2, 3, and 4, with the smaller sections 2 and 3 being located on either side of the larger, central section 4. Each of these housing sections contains a frame of welded angle iron and the frames of the three housing sections are welded together in turn to form a complete frame. With the exception of the bottom of middle housing section 4, panels are welded into the frames at every outer face of each frame. In FIG. 1, panels 2a, 2b, 2e, 4a, 4b, 4c, 3a, and 3b are shown. A door with two flaps 5a and 5b is provided at the bottom of middle housing section 4, said flaps being pivotably articulated to opposite long sides of the frame of the middle housing section. The walls between the two outer housing sections 2 and 3 on the one hand and the middle housing section 4 on the other hand are formed by coarse-mesh nets 6, of which only the one between housing sections 3 and 4 can be seen in FIG. 1 because of the cut-away presentation of panel 4b. These nets 6 divide the total interior of housing 1 into two outer filter chambers F corresponding to the two housing sections 2 and 3 and middle catalyst chamber K corresponding to middle housing section 4. The nets ensure free convection between filter chambers F and catalyst chamber K. Each of filter chambers F contains a filter system, not shown in FIG. 1, while catalyst chamber K contains a catalyst system, likewise not shown in FIG. 1. The angle iron and panels forming housing 1 are preferably made of stainless steel.

The two outer housing sections 2 and 3, with the exception of their walls which are directed upward as shown in FIG. 1, are provided with one opening (11 in FIG. 2) in each wall. Each of these openings is covered on the outside of the corresponding wall with a cover plate 7. Middle housing section 4 has a similar opening, likewise covered externally by a cover plate, in its wall which is at the top in FIG. 1. The cover plates 7, in a manner described in greater detail below, have first seals which open as a function of temperature. Flaps 5a and 5b form a second seal which opens as a function of temperature and are shown in FIG. 1 as dotted lines in their open position. Cover panels 7 and flaps 5a, 5b are also preferably made of stainless steel.

Figure 2:
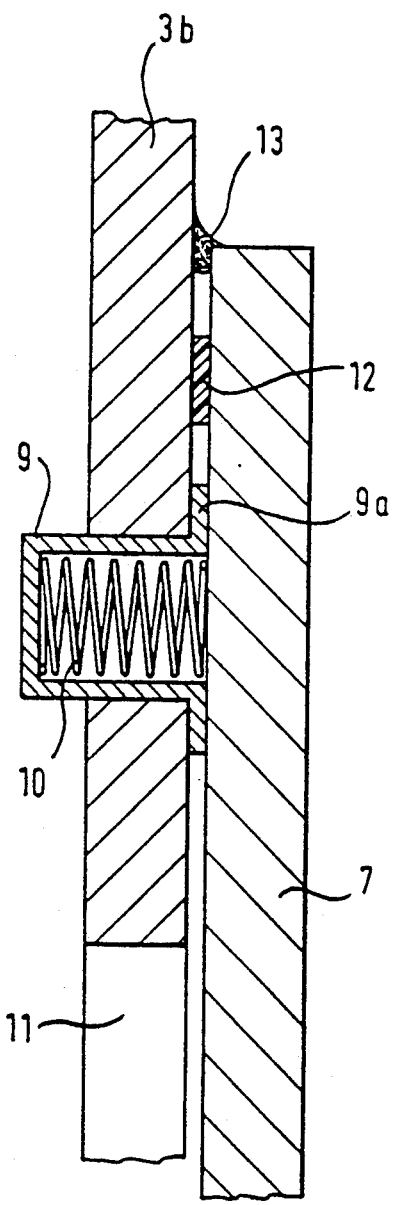
FIG. 2 is a fragmentary cross-sectional view of a preferred embodiment of the seals, shown in closed condition and which open as a function of temperature.

To explain one preferred embodiment of the first seals which open as a function of temperature, reference is made to the enlarged sectional view in FIG. 2. In FIG. 2, 3b represents one of the walls in housing 1 which has a seal of this kind. At the points indicated by dots 8 in FIG. 1, a spring cup 9 is inserted in a hole in the housing wall, said cup abutting the outside of the housing wall with a flange 9a and containing a compressed coil spring 10. Cover plate 7 covers the corresponding opening 11 in the housing wall as well as the abutting edge of the housing wall and rests on flanges 9a of spring cups 9 and if necessary with a spacer 12. Along its entire circumferential edge, cover panel 7 is soldered to the housing wall as indicated by 13 in FIG. 2. The melting point of the solder used for this purpose determines the response temperature of these first seals. As soon as this response temperature is reached and the solder begins to melt, the pretensioned springs 10 force cover plate 7 off the housing wall so that opening 11 is exposed. Cover plates 7 provided in the vicinity of outer housing sections 2 and 3 then fall off the housing by gravity. Cover plate 7 of the seal provided on the top of middle housing section 4 is raised by pretensioned springs 10 from the housing wall to a distance such that unimpeded flow is guaranteed through the corresponding opening.

Flaps 5a and 5b, which form the bottom of middle housing section 4, containing catalyst chamber K, in the readiness state and in the preliminary operating state of the device, are articulated, as described above, to opposite long sides of the frame. The narrow sides of flaps 5a and 5b are fastened in a gas-tight manner to the housing frame in the same way as shown for cover panels 7 in FIG. 2. At the points marked 15 in FIG. 1, a spring cup of the type shown in FIG. 2 is located, with a pretensioned coil spring in the angle iron of the housing, so that a pressure is exerted by the coil spring on the narrow sides of flaps 5a and 5b. Flaps 5a and 5b are soldered along their narrow sides to the angle irons of the housing frame. The solder used for this purpose, not shown in the figures, has a higher melting point than the solder used to solder cover panels 7. In a preferred application of the device, the melting point of the higher-melting solder is approximately 160° C. The flaps are likewise soldered, to achieve a permanent gas-tight seal, along gap 14 between the two flaps 5a and 5b in their closed position and along the long sides of the flaps at which the latter are articulated to the housing frame. Preferably, the solder used at these points is one that melts at a lower temperature than the solder used to solder the narrow sides of the flaps. This ensures that the hinges by means of which flaps 5a and 5b are articulated to the housing frame, are essentially free of interfering solder when the higher temperature is reached and the solder on the narrow sides of flaps 5a and 5b melts.

In an alternative embodiment (not shown), the bottom of the middle housing section 4 can be covered by a seals which comprises a plate applied externally to the opening, and soldered all the way around with a solder whose melting point determines the second response temperature, with the preferred melting point of the solder being approximately 160° C. This plate can be pushed away from the housing, upon melting of the solder, by tensioned springs arranged for instance, like those spring cups 15 shown in FIG. 1.

When, following the occurrence of an accident, the temperature in the vicinity of housing 1 rises to the point where the solder by means of which cover panels 7 are soldered to the housing, melts and the cover panels fall off or are lifted off the housing, a convection flow begins through the housing. The gas mixture surrounding the housing can enter through openings 11 provided in the vicinity of filter chamber F as inlet openings, into the housing and, after filtration by the filter systems inside the filter chambers, passes into the catalyst system in catalyst chamber K. The opening provided in the top of middle housing section 4 forms an outlet opening for this gas flow.

The inlet openings and the outlet openings, depending on their position and size, are dimensioned so that a flow is created in the initial phase of the accident which carries sufficient hydrogen and oxygen to the catalyst system inside catalyst chamber K, but results in only a relatively slight cooling of the catalyst surface. The fact that the gas mixture surrounding housing 1 in this initial phase has access to the catalyst chamber only through the filter systems ensures that no grease or aerosol particles can settle on the catalyst surface. At the same time, the relatively limited heat loss results in rapid heating of the catalyst system.

Figure 4:
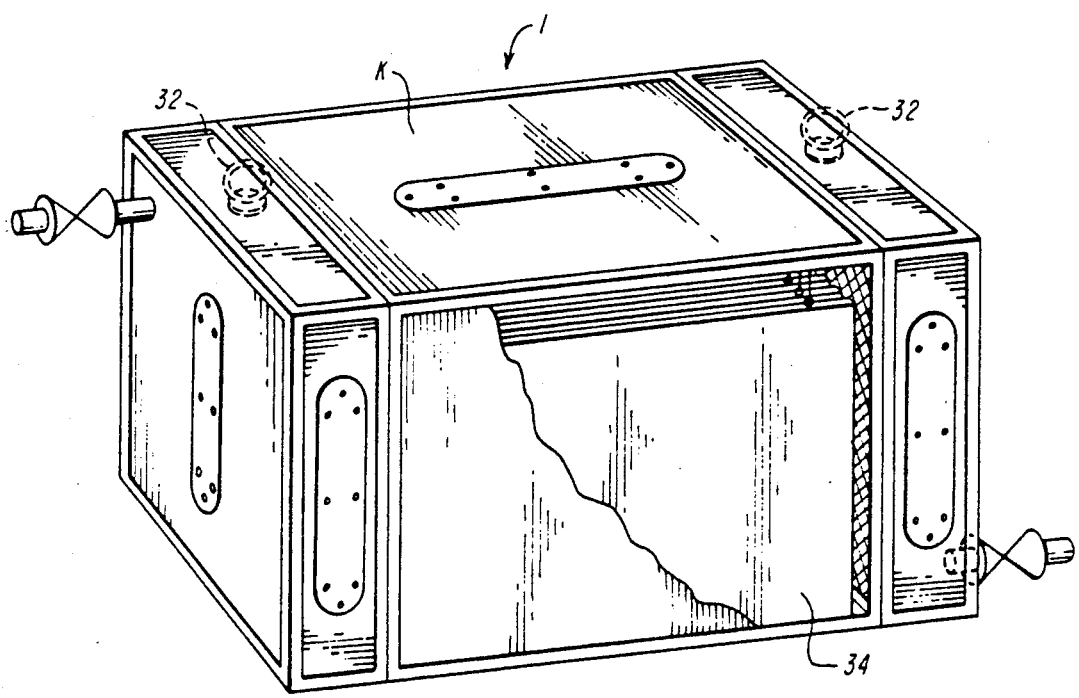
FIG. 4 is a perspective view of one embodiment of the housing in which the catalyst system, comprising a set of catalyst plates, is disposed within the housing.
Figure 5:
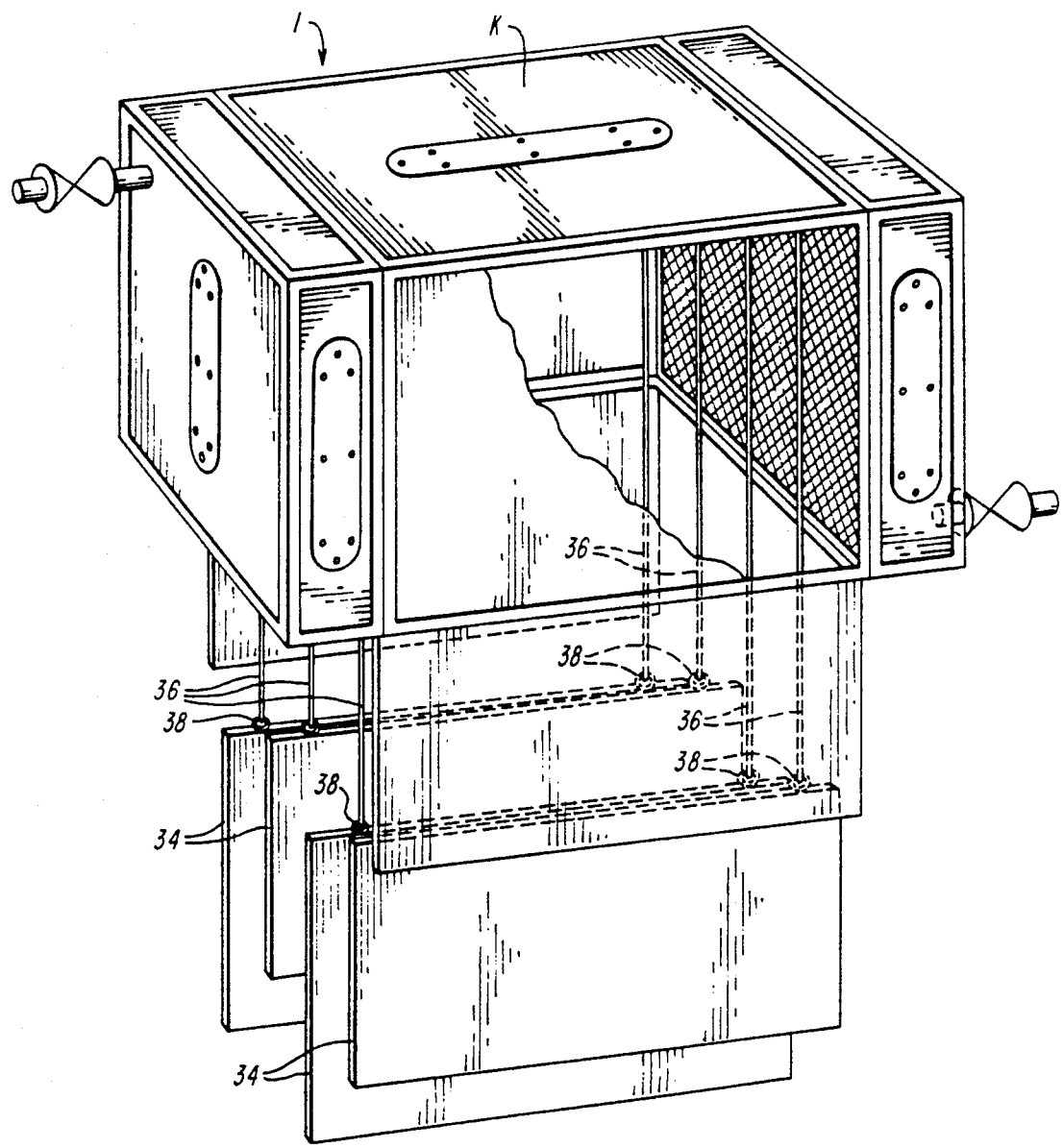
FIG. 5 is a view similar to FIG. 4 except that the catalyst plates of the catalyst system are disposed outside of the housing.

When the temperature has risen sufficiently that aerosol particles and grease particles can no longer settle on the catalyst surface, the second seal in the form of flaps 5a and 5b opens so that the catalyst system is then exposed directly, in other words without interposition of the filter systems, to the ambient gas mixture. As shown in FIGS. 4 and 5, the catalyst system, shown in this particular embodiment as catalyst coated plates 34, can be designed such that it falls out of catalyst chamber K at this point and assumes a position inside the room beneath housing 1. The catalyst system can be suspended from the housing by means such as cables or chains or other flexible support elements 36.

As shown in FIG. 1, the housing is provided on the end wall shown at the right in FIG. 1, in the vicinity of the bottom and on the end wall shown at the left, in the vicinity of the top, with one pipe stub 20 each, containing valves 21. Following installation of the filter systems and the catalyst system and subsequent soldering of the housing, the air contained in the housing must be replaced by an inert gas. This is the purpose of pipe stubs 20 with valves 21 that can be closed airtight. Initially, with the valves open, an inert gas is conducted into the pipe stubs shown at the right until it has expelled the air contained in the housing. Then valve 21 in pipe stub 20 shown at the left is closed and more inert gas is introduced through the other pipe stub until a desired pressure is reached in the housing. Then the second valve is closed as well and the device is in its ready state.

Figure 3:
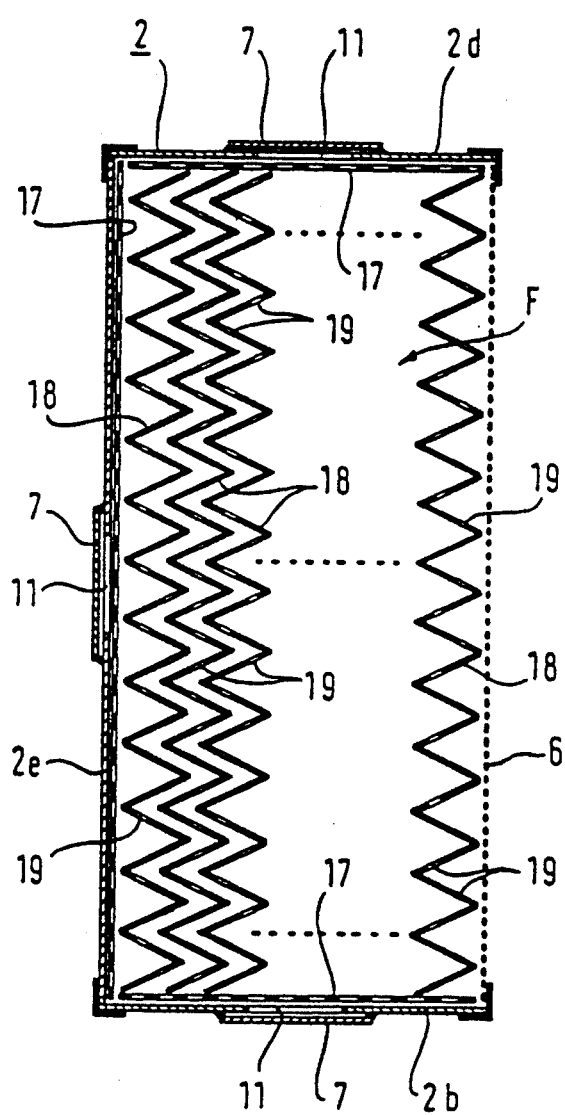
FIG. 3 is a sectional view through one filter chamber along line III—III in FIG. 1.

The panels fastened to the housing frame as walls, especially the panels of middle section housing 1 (4a, 4b, 4c) as well as flaps 5a and 5b can be coated on the inside with catalyst material and thus themselves contribute to the recombination of hydrogen and oxygen. This results in an increase in catalyst surface and also in a more rapid temperature rise within catalyst chamber K during the preliminary operating state FIG. 3 shows a section through housing section 2 with one of filter chambers F and the filter system located therein. Preferably, the filter system has, in front of each of openings 11 which are initially sealed by a cover panel 7, a coarse and therefore highly gas-permeable filter film or filter disk 17, while the remainder of the filter chamber is filled by corrugated, fine filter films 18 nested in one another. Coarse filter disks 17 have a separation efficiency for grease and aerosol particles on the order of 80%, while that of the fine filter films is on the order of 90-99%. Fine filter films 18 can be provided with holes 19 arranged so that the holes of adjacent filter films are staggered with respect to one another. Both the coarse and the fine filter films are HEPA filters. It should be pointed out that filter chamber F in housing section 3 contains a similar filter system.

The catalyst system can be of an essentially very different design. As shown in FIGS. 4 and 5, it can comprise one or more catalyst plates 34, each of which consists of a carrier panel, preferably of stainless steel, coated with catalyst material. In alternative embodiments, granulates or sponges made of catalyst material, in a plate or other form, enclosed in nets, preferably made of stainless steel, can be used, to provide only one additional possible example. As far as the special design of the catalyst system is concerned, the only important thing is that it have sufficient catalyst surface available during the initial preliminary operating state to ensure a rapid rise to operating temperature.

Panel-shaped catalyst elements in particular can be suspended by chains or the like in catalyst chamber K and fall out of the catalyst chamber after flaps 5a and 5b are opened, in order then to hang freely in space at various heights below housing 1 which are determined by the respective chain lengths. In this manner, as described in EP-A-0416143, in addition to the recombination proper, other effects, such as the breakdown of barrier layers, can be achieved. The catalyst system described in EP-A-0416140 can also be used in conjunction with the present application.

Independently of the filter systems located in filter chambers F, the catalyst surfaces of the catalyst system can be covered in turn by a filter layer which remains even in the final operating state on the catalyst elements and produces a certain degree of protection for the catalyst surfaces without adversely affecting the catalytic action.

Housing 50 can be mounted or suspended by means which include chains or cables which attach to mounting eyelets 32. Alternatively, housing 50 can be secured by way of brackets attached to the frame or side panels of housing 50.

In the embodiment of the invention described above, and shown in FIGS. 1-5, the catalyst elements are directly exposed to the atmosphere in the final operating state, either by redirecting gases through the provision of alternative openings in the housing, or by disposing the catalyst elements outside the housing and thereby no longer shielded from the gases by the filters. In another embodiment of the invention shown in FIG. 6, in the final operating state it is the filter that is removed from the path of gas flow to the catalyst elements and thereby exposes the catalyst elements directly to the atmospheric gases.

Figure 6:
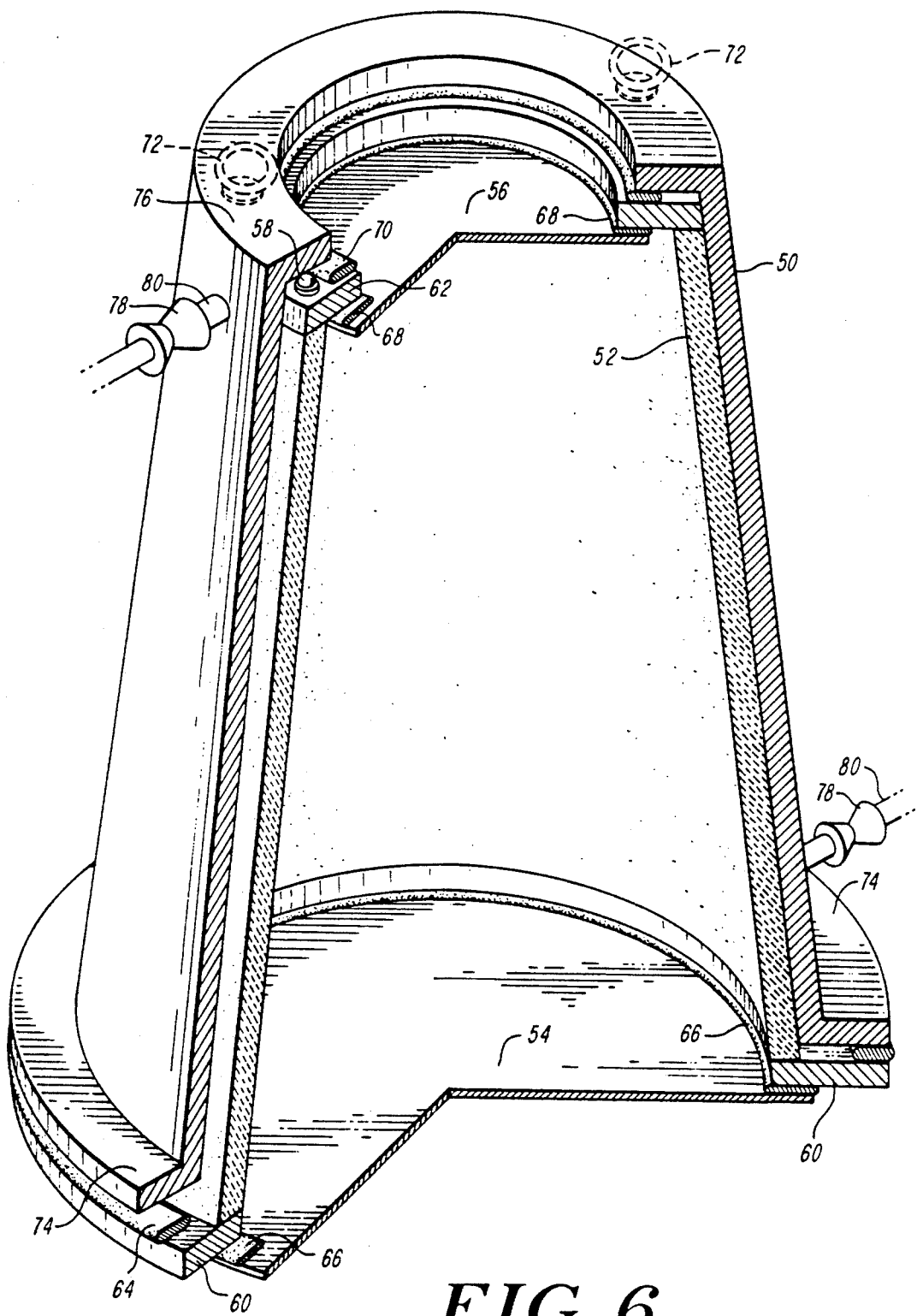
FIG. 6 is a perspective view of a further embodiment of the invention in the readiness condition.

In the illustrated embodiment of the readiness state, FIG. 6, catalyst housing 50 has a frusto conical shape with an innerward projecting lip 76 at the top and an outward projecting lip 74 at the bottom. The inner surface 82 is coated with a catalyst material. Disposed within the catalyst housing 50 is a filter 52. In the illustrated embodiment, the filter 52 is essentially similar in shape to catalyst housing 50 and has an outer diameter smaller than the inner diameter of the catalyst housing 50.

The filter 52 is attached at each end to bottom disc 60 and to top disc 62. The method of attachment of the filter to discs 60 and 62 includes such means as adhesive bonding and clamping.

In the readiness state, the bottom disc 60 is soldered to the bottom lip 74. The melting point of the solder 64 determines the response temperature of the first seals. The top disc 62 is soldered to the top lip 76 by solder 70 whose melting point determines the response temperature of the second seal.

Burst disc 54 and 56 are provided at each end and seal catalyst housing 50 to normally be gas-tight. In the illustrated embodiment, bottom burst disc 54 is soldered to bottom disc 60 by solder 66 which melts at the first response temperature. Likewise, top burst disc 56 is soldered to top disc 62 by solder 68 which melts at the first response temperature. Alternatively, burst discs 54 and 56 can be made of plastic or a bimetallic sheet which melts at the first response temperature. In a preferred embodiment, the solder used for the first seals melts at a temperature of approximately 100° C. and the solder used for the second seal melts at a temperature of approximately 160° C.

In the readiness state, catalyst housing 50 is sealed gas-tight by burst discs 54 and 56, by discs 60 and 62 and by solder joints 64, 66, 68 and 70, and can be suspended from a ceiling or wall by chains, cables or the likes utilizing mounting eyelets 72. Alternatively, catalyst housing 50 can be suspended by way of brackets which attach to the top or side of catalyst housing 50.

Upon reaching the first response temperature, solder joints 64, 66 and 68 melt. Top burst disc 56 and bottom burst disc 54 are released from the structure and fall by the force of gravity away from the catalyst housing 50. If needed, spring cups like those illustrated in FIG. 2 and described above can be utilized to push burst discs 56 and 54 away from discs 60 and 62.

Breaching of the gas-tight seal of the catalyst housing 50 moves the device into the preliminary operating state. Gases entering catalyst housing 50 cannot directly contact the catalyst without first passing through filter 52. Filter 52 prevents deposition of aerosoled particulate matter, including structural material, grease or steam, onto the catalyst.

The heat generated from the exothermic catalytic reaction results in a rapid rise in temperature within the catalyst housing 50. Upon reaching the second response temperature, solder joint 70 melts. The resultant rupture of solder joint 70 allows the device to shift to the final operating state. No longer held by solder joint 70, top disc 62, filter 52 and bottom disc 60 fall from catalyst housing 50 by the force of gravity. To aid in expulsion of the filter assembly, spring cups like those described above may be utilized. In the illustrated embodiment, spring cups 58 are located along the interface of top lip 76 and top disc 62. Alternatively, spring cups may be located along the interface of bottom disc 60 and bottom lip 74. The spring cups are positioned such that they push the discs and filter downwards.

Figure 7:
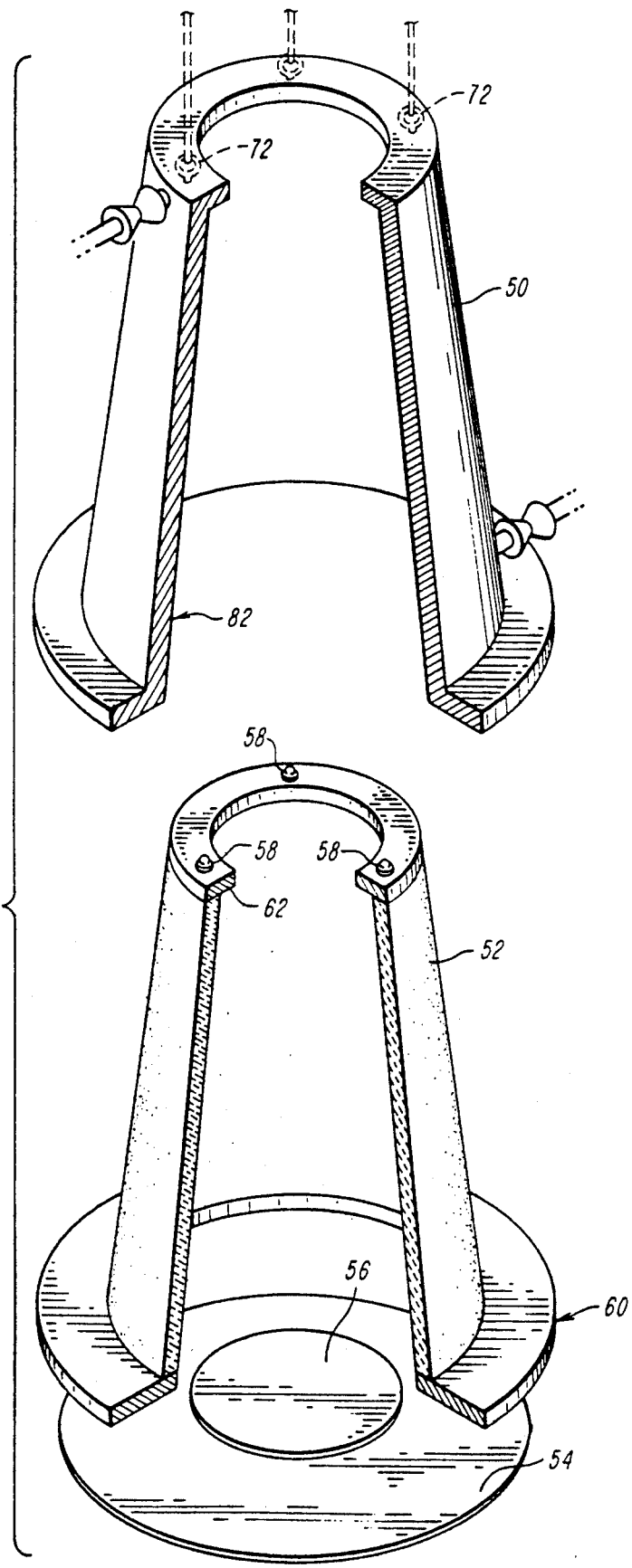
FIG. 7 is a perspective view of the embodiment of FIG. 6 and shown in the operating condition.

In the final operating state, illustrated by FIG. 7, the catalyst elements are directly exposed to the atmosphere gases without interposition of filter 52. The convection flow created by the hot gases and the steam at the catalyst surface is further enhanced by the chimney-like effect that the vertically extending catalyst housing 50 provides between the vertically spaced openings.

The frusto conical shape of catalyst housing 50, illustrated in FIGS. 6 and 7, aids in the expulsion of filter assembly from housing 50 as the sliding frictional coefficient is reduced between filter 52 and the inside wall of housing 50. However, catalyst housing 50 is not limited to this shape. For instance, housing 50, comprising essentially elongated tubes with vertically spaced top and bottom openings, can have a cross-sectional face, normal to the axis of the tube, that is essentially polygonal rather than circular or elliptical.

The overall shape need not be frusto, as there can also be a gap between filter 52 and the inside wall of housing 50 to reduce friction between the two. A gap of this nature can provide a space through which gases heated by the catalytic reaction can rise to aid in melting solder joint 70.

As shown in FIG. 6, the housing is provided with a pipe stub 80 and a valve 78. As detailed for the embodiment illustrated by FIG. 1, the pipe stub 80 and the valve 78 allow for the replacement of the air contained within the housing in the readiness state with inert gases.

Those skilled in the art will recognize, or be able to ascertain using no more than routine experimentation, numerous equivalents to the apparatus described herein. Such equivalents are considered to be within the scope of this invention.

What is claimed is:

1. Apparatus for removing hydrogen from an atmosphere having a mixture of gases, said apparatus including a housing and a catalyst system that catalyzes the oxidation of hydrogen in an exothermic reaction, said housing having at least one inlet opening and at least one outlet opening, said apparatus characterized by the improvement comprising
    A. first seal means sealing said openings gas tight, said first seal means opening as a function of a predetermined first response temperature,
    B. gas permeable filter system, substantially impermeable to aerosols and grease, said filter system being disposed in said housing in such a way that after opening of said first seal means, the gases or gas mixtures entering said inlet opening reach the catalyst system only after passing through said filter system,
    C. at least one additional opening provided in said housing, so arranged relative to said housing that said catalyst system, after opening of a second seal means, is exposed without interposition of said filter system, directly to the flow of said gases or gas mixtures, and
    D. said second seal means sealing said additional opening gas tight, said second seal means opening as a function of a predetermined second response temperature, said predetermined second response temperature being higher than said predetermined first response temperature.

2. Apparatus according to claim 1, further characterized by said housing being divided into at least one filter chamber and one catalyst chamber, and by said inlet opening being provided in the vicinity of said filter chamber, and by said outlet opening and one additional opening being provided in the vicinity of said catalyst chamber, and by the position and area of said inlet opening and said outlet opening being selected so that after opening of said first seal means, as a result of natural convection, a flow is created through said inlet opening, said filter chamber containing said filter system, said catalyst chamber, and said outlet opening.

3. Apparatus according to claim 2, further characterized by the housing, made essentially parallelepipedic, having said filter chambers at its two ends, and between them, said catalyst chamber.

4. Apparatus according to claim 2, further characterized by the housing being subdivided by coarse-mesh nets into said filter chamber and said catalyst chamber.

5. Apparatus according to claim 2, further characterized by said housing being arranged for normally upright orientation and having a relatively upper wall portion and a relatively lower wall portion, said housing having said outlet opening in said upper wall portion and said inlet opening in said lower wall portion.

6. Apparatus according to claim 2, further characterized by said inlet opening, in said filter chamber, being covered by a relatively coarse filter means and the remainder of the filter chamber being filled with relatively fine, corrugated filter films.

7. Apparatus according to claim 6, further characterized by said relatively coarse filter means having a separation efficiency of about 80% for aerosols and grease particles, while said relatively fine filter films have a separation efficiency of 90 to 99%.

8. Apparatus according to claim 6, further characterized by said fine filter films being provided with holes, said holes of two adjacent filter films being arranged staggered with respect to one another.

9. Apparatus according to claim 1, further characterized by said first seal means comprising a cover plate, applied externally to the corresponding opening, said cover plate being soldered all the way around to housing by a solder that melts at said predetermined first response temperature, with tensioned springs being placed between said cover plate and housing wall, said springs pushing said cover plates away from said housing when said solder melts.

10. Apparatus according to claim 1, further characterized by an additional opening being provided in the bottom of said housing in the vicinity of said catalyst chamber.

11. Apparatus according to claim 10, further characterized by said second seal means comprising a plate applied externally to said additional opening and soldered all the way around with a second solder whose melting point determines said second response temperature, with tensioned springs being interposed between said plate and said housing, said springs forcing said plate away from said housing when said second solder melts.

12. Apparatus according to claim 10, further characterized by the second seal means having at least one flap pivotably articulated to said housing, said flap being soldered at least partially to said housing by means of a second solder whose melting point determines said second response temperature, and is openable by interposed tensioned springs when said second solder melts.

13. Apparatus according to claim 12, further characterized by the side of said flap which faces inward, prior to said second response temperature, being coated with said catalyst material.

14. Apparatus according to claim 1, further characterized by the housing having a frame of angle iron to which the panels forming the external housing walls are fastened in a gas-tight manner, preferably by soldering or welding.

15. Apparatus according to claim 14, further characterized by at least some of the panels forming said external housing walls being coated on their insides with catalyst material.

16. Apparatus according to claim 1, further characterized by said catalyst system comprising one or more catalyst elements which are fastened by flexible retaining means to said housing in such a fashion that after opening of said second seal, said catalyst elements drop out of said catalyst chamber to a distance which is determined by the length of said flexible retaining means.

17. Apparatus according to claim 1, further characterized by said housing being provided with means for generating and maintaining an inert gas atmosphere inside said housing at a pressure which is higher than that of the atmosphere surrounding said housing.

18. Apparatus for removing hydrogen from an atmosphere having a mixture of gases, said apparatus including a housing and a catalyst means that catalyzes the oxidation of hydrogen in an exothermic reaction, said housing having at least one inlet opening and at least one outlet opening, said apparatus characterized by the improvement comprising
   A. said housing being gas-tight except at said openings, said openings being arranged such that a gas flow of said atmosphere therein between said openings passes through said housing,
   B. first seal means having initially a sealing condition for sealing said openings gas-tight, and assuming a release condition for opening said inlet and said outlet openings in response to a predetermined first response temperature,
   C. said catalyst means being located in said housing exposed to the path of said gas flow between said inlet and said outlet openings,
   D. gas permeable filter means substantially impermeable to aerosols and grease, said filter means being disposed across the path of said flow of gases to said catalyst means from said inlet opening, and
   E. means for exposing said catalyst means selectively to atmospheric gas, without interposition of said filter means, said exposing means initially having a first condition in which gas flow traverses said filter means before contacting said catalyst means, said exposing means assuming a second condition in response to a predetermined second response temperature, and exposing, when in said second condition, said catalyst means to said gas flow without interposition of said filter means.

19. Apparatus according to claim 18, further characterized in that
   A. said filter means is arranged to have different positions relative to catalyst when in said first and second conditions,
   B. said exposing means comprises a releasable element, said releasable element releasing said filter means from a position in said first condition, in response to said predetermined second response temperature, to a position in said second condition in which said gas flows to said catalyst means without interposition of said filter means.

20. Apparatus according to claim 18, further characterized by said exposing means comprising at least one additional opening in said housing and a second seal means sealing said additional opening gas tight, said second seal means opening as a function of said predetermined second response temperature and opening said additional opening, wherein said additional opening is so arranged relative to said housing that said catalyst means, after opening of said additional opening, is exposed without interposition of said filter system, directly to the flow of said gases.

21. Apparatus according to claim 18, further characterized in that
   A. said catalyst means is arranged to have different positions relative to said filter means when in said first and second conditions,
   B. said exposing means comprises a disposing means, said disposing means disposing said catalyst means from a position in said first condition, in response to said predetermined second response temperature, to a position in said second condition in which said gas flows to said catalyst means without interposition of said filter means.

22. Apparatus according to claim 21, further characterized by said catalyst means comprising one or more catalyst elements which are fastened by flexible retaining means to said housing in such a fashion that after being disposed by said disposing means, said catalyst elements drop out of said housing to a distance which is determined by the length of said flexible retaining means.

23. Apparatus according to claim 18, further characterized by said housing being provided with means for generating and maintaining an inert gas atmosphere inside said housing at a pressure which is higher than that of the atmosphere surrounding said housing.

24. Apparatus according to claim 18, further characterized by said housing having a vertically-extending body with vertically spaced openings, said vertically spaced openings arranged in said housing so as to create a chimney effect whereby a convection flow of gases created by the exothermic catalytic reaction is increased.

25. Apparatus according to claim 18, further characterized by said exposing means exposing said catalyst means in response to a temperature greater than a temperature at which said first seal means assume said release condition.

26. Apparatus according to claim 18, further characterized by said first seal means comprising a cover plate, applied externally to the corresponding opening, said cover plate being soldered all the way around to housing by a solder that melts at said predetermined first response temperature.

27. Apparatus according to claim 18, further characterized by said filter means having a separation efficiency of greater than about 80% for aerosols and grease particles.

* * * * *